J. JAMESON.
Plow-Cleaner.

No. 67,550.  Patented Aug. 6, 1867.

Witnesses:
Geo. H. Griebel
P. T. Dodge

Inventor:
J. Jameson
Dodge & Munn, attys

United States Patent Office.

JACOB JAMESON, OF PHILADELPHIA, PENNSYLVANIA.

Letters Patent No. 67,550, dated August 6, 1867.

IMPROVEMENT IN DEVICE FOR CLEARING WEEDS FROM PLOUGHS.

*The Schedule referred to in these Letters Patent and making part of the same.*

TO ALL WHOM IT MAY CONCERN:

Be it known that I, JACOB JAMESON, of Philadelphia, in the county of Philadelphia, and State of Pennsylvania, have invented certain new and useful Improvements in Plough-Clearing Device; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention consists in arranging a device on a plough in such a manner as to be operated by the motion of the plough, and remove the weeds and trash that naturally gather in front of the same in ploughing.

It is well known that in ploughing, the weeds, grass, stubble, and similar material gather on the front of the plough, and tend to choke it up and throw the plough out of the ground, especially in turning under clover or similar green crops for summer fallowing and soiling. So great is this evil that it is frequently necessary to have a person walk along by the side of the plough, with a forked stick or other suitable implement, and force away the accumulation.

Figure 1:
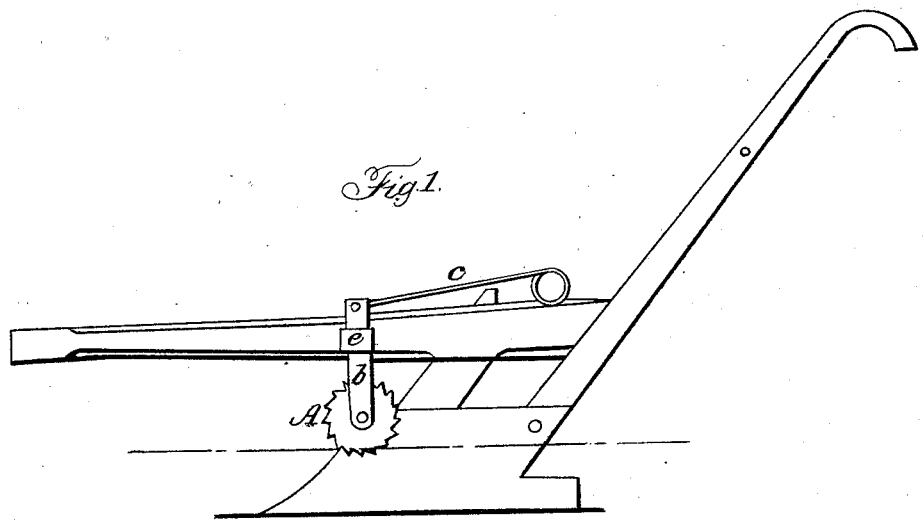
Figure 1 is a side view of a plough with my improvement applied.
Figure 2:
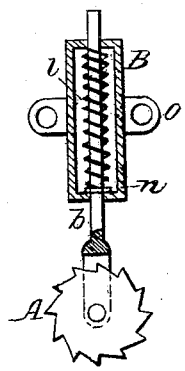
Figure 2 represents a modification of the same.

To remedy this difficulty I provide a wheel, A, having teeth or notches on its periphery, and mount it in the lower forked end of a bar or stem, $b$. This stem is then secured in a vertical position on the land-side of the plough-beam, so as to bring the wheel about half its diameter in front of the shin or front edge of the plough, as shown in fig. 1. The stem $b$, to which the wheel is secured, is arranged to slide loosely up and down, being held in position by a plate, $e$, or similar means, its upper end being attached to a spring-rod or bar, $c$, which latter is attached at its opposite end to the beam; or, if preferred, a metal case, B, may be provided, and the stem $b$ be passed through it, with a spiral spring inside, which will press the wheel down, allowing it to yield to adapt itself to the inequalities of the surface on which it is intended to press, with sufficient force to cause it to rotate as the plough is moved forward. The case B must be provided with ears $o$, by which it can be bolted to the plough-beam.

It will be seen that when the wheel is thus applied to the plough, and the latter is drawn along, the wheel will be caused to rotate, and the teeth on its front edge will take hold on the weeds, grass, &c., that gather at the front of the plough, and crowd them down at the front of the plough, from whence they will be drawn off and covered by the furrow-slice on the mould-board side of the plough; or, if drawn off on the land-side, will be left on the surface, and turned under with the furrow at the next round. In this way I provide a simple, efficient, and self-operating device for the intended purpose.

Having thus described my invention, what I claim, is—

The wheel A, attached to the sliding or yielding stem, and held down by a spring, when applied to a plough, substantially as and for the purpose set forth.

JACOB JAMESON.

Witnesses:
H. B. MUNN,
W. C. DODGE.